S. M. BICKFORD.
TRUCK.
APPLICATION FILED JAN. 31, 1914.
1,095,785.
Patented May 5, 1914.
2 SHEETS—SHEET 1.
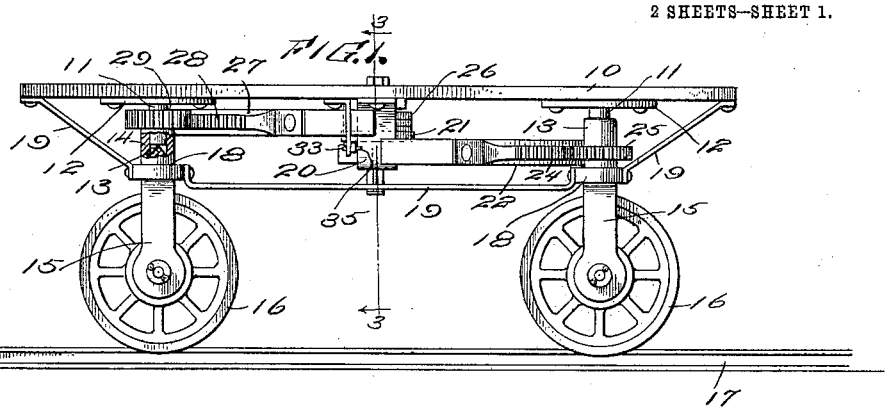
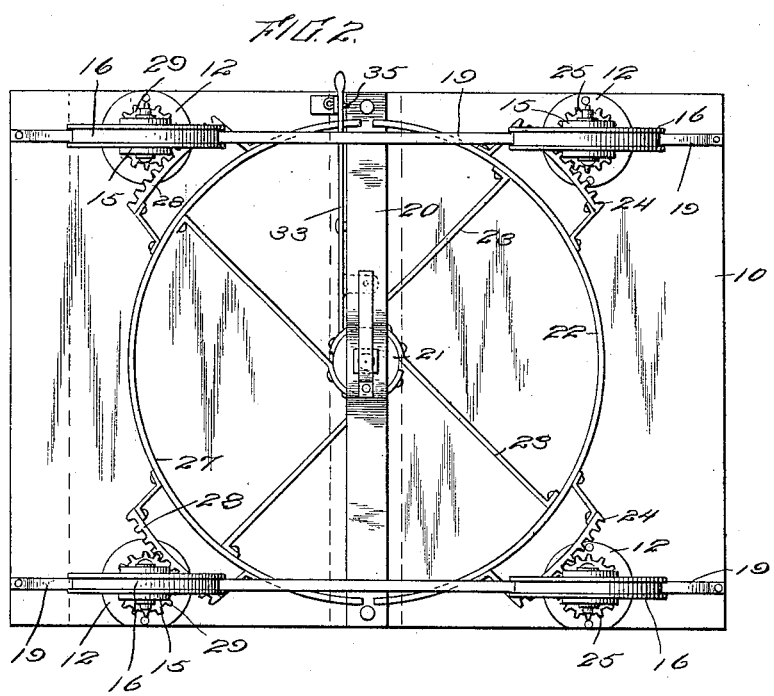
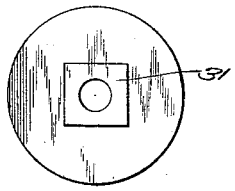
Witnesses
Inventor
S. M. Bickford,
By Mason Fenwick Lawrence,
Attorneys S. M. BICKFORD.
TRUCK.
APPLICATION FILED JAN. 31, 1914.
1,095,785.
Patented May 5, 1914.
2 SHEETS—SHEET 2.
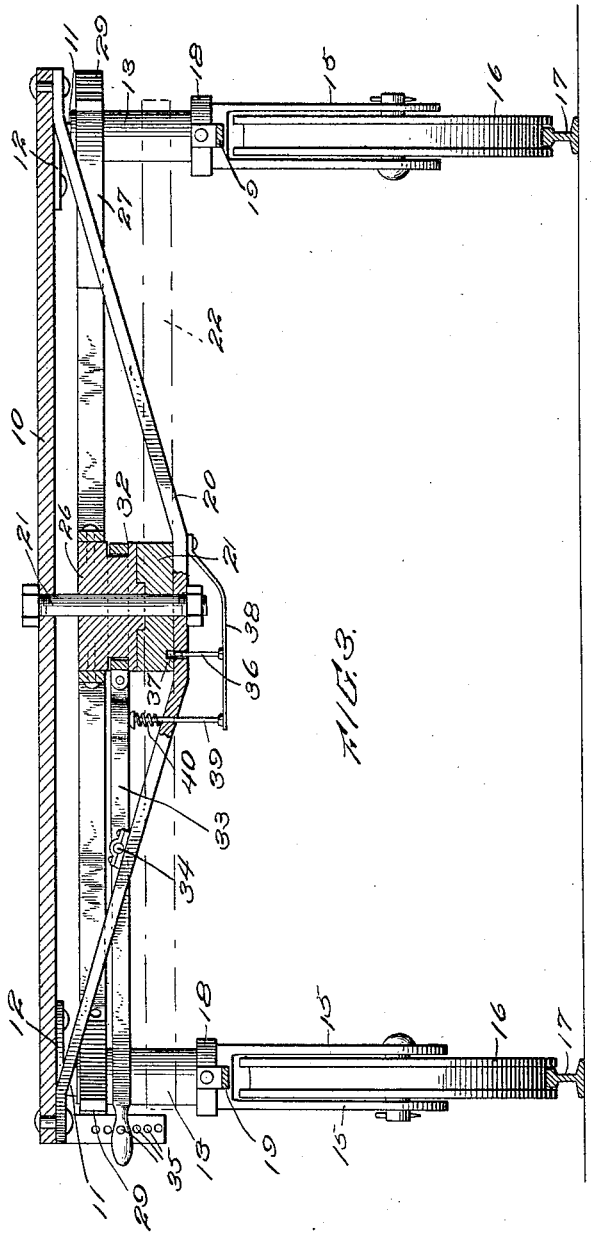

UNITED STATES PATENT OFFICE.

SAMUEL M. BICKFORD, OF CURWENSVILLE, PENNSYLVANIA.

TRUCK.

1,095,785.  Specification of Letters Patent.  Patented May 5, 1914.

Application filed January 31, 1914. Serial No. 815,846.

*To all whom it may concern:*

Be it known that I, SAMUEL M. BICKFORD, a citizen of the United States, residing at Curwensville, in the county of Clearfield and State of Pennsylvania, have invented certain new and useful Improvements in Trucks; and I do hereby declare the following to be a full, clear, and exact description of the invention, such as will enable others skilled in the art to which it appertains to make and use the same.

This invention relates to trucks and has for an object to provide a truck adapted to be operated upon lateral or branch tracks without the necessity of employing a turn table.

A further object of the invention is to provide means whereby all of the wheels under the truck may be simultaneously turned so that said wheels will move in a direction at right angles to their prior course or at such other angle as the operator may determine.

A further object of the invention is to provide means whereby one pair of wheels to constitute the rear wheels may be locked and the other pair of wheels to constitute the front wheels may be constructed to run as caster wheels or to be rotated by the hand of the operator.

With these and other objects in view the invention comprises certain novel constructions, combinations and arrangement of parts as will be hereinafter more fully described and claimed.

In the drawings: Figure 1 is a view of the improved truck in side elevation. Fig. 2 is an inverted plan view of the improved truck. Fig. 3 is a sectional view through the improved truck taken on line 3—3 of Fig. 1. Fig. 4 is a detail view of one segment of the guiding hand wheel. Fig. 5 is a detail plan view of one of the engaging collars. Fig. 6 is a detail plan view of the other engaging collar.

Like characters of reference designate corresponding parts throughout the several views.

The improved truck which forms the subject matter of this application comprises a platform or top 10 having adjacent its opposite corners a plurality of studs 11 extending down and secured to said platform in any usual and approved manner as by the employment of the flange 12. It will be understood that these studs 11 are rigid with the platform 10 and about such studs sleeves 13 are employed which rotatably embrace said studs and are provided in their bottoms with bearing points 14 which bear against the lower ends of the studs 11 and produce cone bearings. At their lower ends the sleeves 13 carry bifurcated arms 15 between which are journaled wheels 16. As shown in the drawings the wheels 16 are provided with grooved peripheries to travel up rails 17 but it is to be understood that wheels with any form of peripheries may be employed upon this truck as the contingencies of operation may make desirable. It is also found desirable to strengthen the resistance of the pins 11 by employing collars 18 around the sleeves 13 which said collars are braced by such bracing as shown at 19 or any usual and approved bracing structure. As thus mounted it is apparent that all of the wheels 16 are free to rotate upon the studs 11 as axes which under ordinary conditions of usage would be found undesirable. To bring out the utility of such a structure a support 20 depends from the under side of the platform 12 with a king-bolt 20' centrally of the platform and support. Upon the brace and about the king-bolt 20' a collar 21 is mounted to which is rigidly secured a semi-circular segment 22 by means of radial braces 23. The segment 22 carries segmental racks 24 which engage pinions 25 rigidly secured upon two of the sleeves 13. It will be apparent that by rotating the segment 22 the pinions 25 and the sleeves will also be rotated to change the direction of travel of the wheels 16 carried thereby.

Above the collar 21 a second collar 26 is mounted likewise carrying a segment 27 which in turn carries segmental racks 28 engaging pinions 29 secured to the sleeves 13 the same as the pinions 25. It will be apparent therefore that a manual rotation of the segment 27 will change the direction of travel of the wheels served by such segment. The collars 21 and 26 are provided with interlocking means, here shown as of squared shoulder and socket variety, the socket being shown particularly at 30 in Fig. 5 and the shoulder at 31 in Fig. 6. When, therefore, the two collars 21 and 26 are interlocked by the shoulder of one engaging within the socket of the other a manual movement of one of the segments 22 or 27 will serve to similarly rotate the other and simultaneously rotate all of the wheels upon their studs.

Under ordinary conditions of use when it is desired to move the truck along one track to a given point and to transfer to a lateral track without the employment of a turn table the segments will be united as above described. When the transfer point is reached the operator will manually rotate one of the segments 22 or 27 until the wheels are positioned to move at right angles to the previous path of movement when the truck will be moved laterally relative to its prior movement. At times, however, it is desirable to employ one set of wheels only as caster wheels and the other set of wheels to be locked. For such purpose the collar 26 is provided with a groove 32 and a lever 33 is pivoted as at 34 to the support 20. At its outer end the lever is also provided with adjusting means as the holes and pin 35. It will be apparent, especially from a reference to Fig. 3 that a depressing of the outer or handle end of the lever 33 will serve to raise the collar 26 and the segment 27 therewith until the shoulder 31 is disengaged from the socket 30 when the segments are then unlocked. At the same time that the collar 26 is raised the lower collar 21 is locked by means of a pin 36 slidably mounted in the support 20 and in position to engage a socket 37 formed in the collar 21. The pin 36 is actuated by means of a spring 38 which in turn is controlled by a plunger 39 and spring 40, the plunger bearing against the lever 33 as indicated more particularly at Fig. 3. It will be apparent, therefore, that by depressing the outer or handle end of the lever 33 the collars 21 and 26 are not only unlocked from each other but the collar 21 is also locked relative to the frame so that one pair of wheels is held in rigid position while the other pair is free to caster or to be moved manually. In this manner the truck becomes an ordinary truck for use upon a floor or other plain surface.

I claim:

1. In a truck, a platform; wheel bearings journaled beneath the platform; means to simultaneously rotate all of said wheel bearings in a horizontal plane; and means to uncouple said manual rotating means whereby a part only of said bearings are rotated.

2. In a truck, a platform; a plurality of independent wheel supporting bearings journaled beneath the platform and rotatable in a horizontal plane; means to rotate all of said wheel bearings simultaneously in such horizontal plane; and means to simultaneously lock part of said bearings against rotation and permit the rotation of others of said parts independently.

3. In a truck, a platform; a plurality of independent wheel bearings journaled beneath the platform and rotatable in a horizontal plane; segments independently controlling a part only of said wheel bearings; means to lock the segments to move together to control all of said bearings simultaneously; and means to simultaneously unlock said segments from interengagement and lock one against movement.

4. In a truck, a platform; a plurality of spindles depending from the platform; sleeves journaled upon the spindles; wheel bearings carried by the sleeves; pinions carried by the sleeves; a plurality of segmental locks engaging the pinions; means interlocking the segmental locks whereby all of said pinions are rotated simultaneously; and means to simultaneously unlock the said segmental locks so that part of said locks are held against movement and part are subject to manual movement.

5. In a truck, a platform; a plurality of studs depending from the platform; sleeves mounted to rotate upon the studs; wheels journaled upon the sleeves; pinions carried upon the sleeves; a plurality of segmental locks engaging the pinions; means whereby the movement of one of said locks moves all of said locks synchronously; a lever fulcrumed upon the platform; and means carried by the lever for simultaneously locking some of said segments against rotation and unlocking other of said segments from such synchronous action.

6. In a truck, a platform; studs depending from the platform; sleeves journaled upon the studs; wheels journaled upon the sleeves; pinions carried by the sleeves; superposed collars journaled midway between the pinions; a segment carried by one of said collars extending toward some of said pinions; a segment carried by the other of said collars extending toward others of said pinions; segmental locks carried by said segments in engagement with said pinions; interlocking means between the collars; and means to raise one of said collars out of such interlocking engagement with the other of said collars.

In testimony whereof I affix my signature in presence of two witnesses.

SAMUEL M. BICKFORD.

Witnesses:
KATHARINE J. SHEARER,
M. J. LALLY.